No. 690,820. Patented Jan. 7, 1902.
A. ARTHUR.
AUTOMATIC WEIGHING MACHINE.
(Application filed Oct. 14, 1901.)
(No Model.)
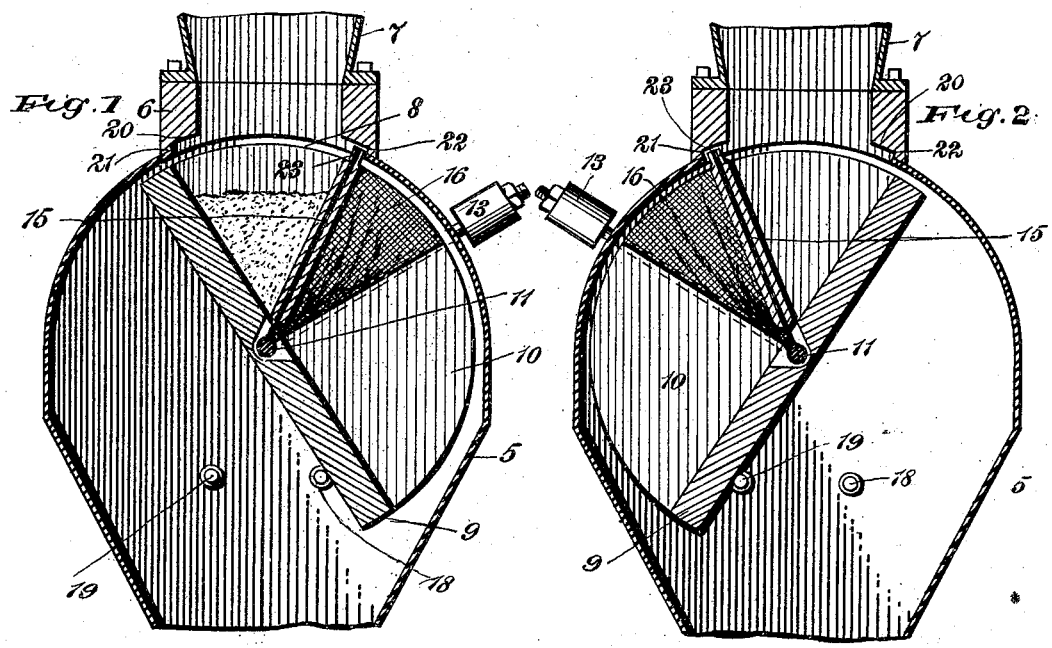
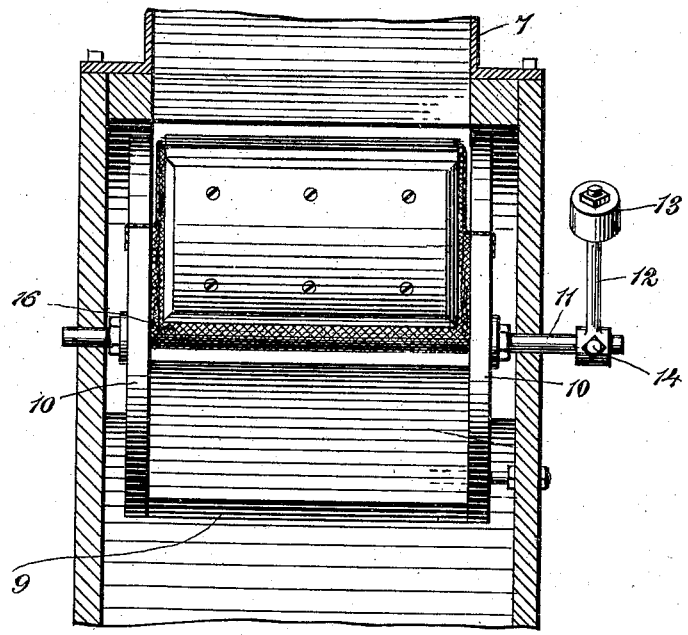
WITNESSES:
INVENTOR
Albert Arthur
BY
ATTORNEYS

UNITED STATES PATENT OFFICE.

ALBERT ARTHUR, OF EAST PITTSBURG, PENNSYLVANIA, ASSIGNOR OF NINE-TWENTIETHS TO WALTER LAUTENSLAGER, OF EAST PITTSBURG, PENNSYLVANIA.

AUTOMATIC WEIGHING-MACHINE.

SPECIFICATION forming part of Letters Patent No. 690,820, dated January 7, 1902.

Application filed October 14, 1901. Serial No. 78,567. (No model.)

*To all whom it may concern:*

Be it known that I, ALBERT ARTHUR, a citizen of the United States, and a resident of East Pittsburg, in the county of Allegheny and State of Pennsylvania, have invented a new and useful Improvement in Automatic Weighing-Machines, of which the following is a full, clear, and exact description.

The invention relates to automatic weighing-machines by which granular material, such as grain, may be divided into lots of regular predetermined weight.

The object that I have in view is the provision of simple automatic mechanism for weighing granular material in which a tiltable trough is pivotally mounted within a suitable receptacle. Said trough is equipped with a shiftable partition, which is connected to the trough by a pliable or flexible connection that permits the trough to have a certain amount of play independently of the partition when the trough changes its position, whereby the partition subdivides the trough into compartments, in one of which the grain is adapted to accumulate in such a way that the weight of the grain is imposed upon that side of the trough which is to be forced downward by the load when the latter reaches the predetermined quantity.

With these ends in view the invention consists in the novel combination, construction, and arrangement of parts, which will be hereinafter fully described and claimed.

Reference is to be had to the accompanying drawings, forming a part of this specification, in which similar characters of reference indicate corresponding parts in all the figures.

Figure 1 is a vertical cross-section showing one position of the tiltable trough and the shiftable partition thereof. Fig. 2 is a similar sectional view representing the tiltable trough and its partition in their reversed positions, and Fig. 3 is a vertical sectional elevation in a plane at right angles to Figs. 1 and 2 and showing the tiltable trough and its partition in elevation.

5 designates any suitable form of casing, which may be constructed of sheet metal, wood, or other material. Upon this casing is secured the base-section 6 of a hopper 7, the said base-section being in communication with the hopper and with an opening or slot 8, which is formed in the upper side of the casing.

Within the casing 5 is mounted a tiltable trough, the same consisting of the bottom 9 and the side walls 10. The side walls are preferably semicircular, as shown by Figs. 1 and 2, and the bottom 9 is flat, the parts forming the trough being rigidly secured together. Said trough is supported within the casing by a pivotal or rock shaft 11, the same being secured firmly to the bottom of the trough and journaled in suitable bearings provided in the sides of the casing. The ends of the rock-shaft are extended or prolonged beyond the sides of the casing in order that a resistance device may be operatively disposed with relation to the trough. Any suitable form of resistance device known to the art may be adopted; but in the drawings I have shown said resistance device in the form of an arm 12 and a counterpoise 13. The arm is fitted on the shaft and secured firmly thereto by a set-screw, (indicated at 14 in Fig. 3.) Any suitable means may be adopted for securing the counter poise or weight 13 on the arm, and, if desired, this weight may be adjustably clamped to the arm.

One of the important features of my invention resides in the partition 15, which forms a part of the tiltable trough. This partition is not secured rigidly to the bottom or the side walls of the trough, but, on the contrary, it is loosely connected therewith through the medium of the flexible connection 16. This flexible connection may be of any suitable character; but I prefer to employ a strong fabric, such as canvas, which is secured firmly to the end and bottom edges of the partition, and is fastened in like manner to the side walls of the trough and to the pivotal shaft 11. The flexible connection between the partition and the trough permits one of these elements to have a limited movement relative to the other. The partition 15 serves, in conjunction with the flexible connection, to divide the trough into separate compartments, as clearly indicated by Figs. 1 and 2.

The rocking or tilting movement of the trough within the casing is limited in one direction by the provision of a stop 18, which is fastened in the casing to lie in the path of the bottom 9 of said trough when the latter is in the position shown in Fig. 1. Another stop 19 is secured within the casing so as to lie in the path of the bottom of the trough when said trough is tilted to the oppositely-inclined position, as shown by Fig. 2. It is evident that the two stops limit the movement of the trough, so that it will properly assume its loading position within the casing. I have also provided means for limiting the movement of the partition with relation to the hopper or the base-section 6 thereof, and in the embodiment of the invention shown by the drawings the side walls of the base-section 6 are provided with the notches 20, which form the ledges or shoulders 21 and 22. The partition 15 is provided at its upper free edge with a lug 23 or its mechanical equivalent, the said lug being extended into the base-section 6 of the hopper and adapted to enter either of the notches 20, so as to engage with one or the other of the shoulders 21 and 22.

Assuming that the trough is in the position shown by Fig. 1, the bottom 9 engages with the stop 18, and the stud 23 of the partition is in engagement with the stop-shoulder 22 of the hopper. The partition 15 occupies such relation to the hopper that a chamber is formed within the trough, into which chamber the granular material is free to flow until the desired quantity shall have accumulated therein. The weight of the material is imposed practically upon the bottom of the trough, and the pressure of the material against the partition 15 keeps it in the desired position. As soon as the proper quantity of material accumulates in the compartment of the trough to overcome the inertia of the counterpoise 13 the trough is caused to rock or turn on the axis afforded by the shaft 11, and consequently the trough is automatically reversed within the casing 5, so that the parts of the trough will assume the position shown by Fig. 2. The material contained in the loaded compartment of the trough is automatically discharged therefrom by the bottom of the trough assuming a reversed inclined position. During this reversal of the trough the partition 15 remains at rest until the flexible connection 16 shall have been carried by the moving trough beyond the position of said partition as indicated by Fig. 1, and immediately thereafter the flexible connection 16 pulls on said partition 15, so as to reverse the position of the partition with relation to the hopper. The movement of the shiftable partition 15 toward the left is arrested by the lug 23 thereof engaging with the stop-shoulder 21. From this description it is apparent that the trough and its partition are automatically reversed within the casing in a manner to present a connected compartment of the trough directly below the hopper, and the operation of once more weighing out a predetermined quantity of material may now be repeated.

Having thus described my invention, I claim as new and desire to secure by Letters Patent—

1. In an automatic weighing-machine, the combination with a casing and a tiltable trough therein, of a shiftable partition disposed within said trough and united thereto by an intermediate flexible connection, and means for limiting the movement of said partition with relation to said trough, substantially as described.

2. In an automatic weighing-machine, the combination with a casing, of a tiltable trough mounted therein, means for limiting the tiltable movement of said trough, a partition disposed within the trough and united thereto by an intermediate flexible connection, a resistance device opposing the movement of the trough, and means for limiting the movement of the partition relative to the casing and to the trough, substantially as described.

3. In an automatic weighing-machine, a trough provided with a tiltable partition which is united thereto by an intermediate flexible connection adapted to serve in conjunction with said partition in forming separate compartments within the trough, in combination with a casing, a resistance device opposing the action of the trough, and means for limiting the movement of the partition relative to the trough and the casing, substantially as described.

4. In an automatic weighing-machine, the combination of a casing, a hopper provided with stop-shoulders, a tiltable trough within said casing, a partition united to the trough by an intermediate flexible connection and provided with a lug which is extended into the hopper to engage alternately with the stop-shoulders thereof, and a resistance device opposing the action of the trough, substantially as described.

5. An automatic weighing-machine comprising a casing, a hopper surmounting the casing and having stop-shoulders, a rock-shaft mounted in the casing and provided with a weighted arm, a tiltable trough secured to the rock-shaft and disposed within the casing, stops supported in the casing in the path of the trough, and a shiftable partition united to the trough by an intermediate flexible connection and provided with a lug which is adapted to engage with the stop-shoulders of the hopper, substantially as described.

6. In a weighing-machine, a tiltable trough provided with a hinged partition adapted to have a limited movement within said trough, said partition having such relation to the sides of the trough as to cut off the passage of material from one compartment to the other of said trough.

7. In a weighing-machine, a tiltable trough provided with a partition having a limited movement relative to the ends of said trough, combined with means for limiting the movement of the partition independently of the trough.

8. A tiltable trough provided with a movable partition, and a flexible connection uniting the sides of said partition to the trough, said flexible connection coöperating with the partition in forming isolated compartments in the trough.

In testimony whereof I have signed my name to this specification in the presence of two subscribing witnesses.

ALBERT ARTHUR.

Witnesses:
    HARRY HENNING,
    HARRY COMMON.